United States Patent [19]
Lee

[11] Patent Number: 5,949,744
[45] Date of Patent: Sep. 7, 1999

[54] OPTICAL PICKUP APPARATUS

[75] Inventor: Kwan-Cheol Lee, Seoul, Rep. of Korea

[73] Assignee: Daewoo Electronics Co., Ltd,, Seoul, Rep. of Korea

[21] Appl. No.: 09/000,677

[22] Filed: Dec. 30, 1997

[30] Foreign Application Priority Data

Dec. 30, 1996 [KR] Rep. of Korea ................. 96-77239

[51] Int. Cl.⁶ ........................................................ G11B 7/00

[52] U.S. Cl. ................................. 369/44.17; 369/44.19; 369/44.21; 369/44.22

[58] Field of Search ............................. 369/44.14, 44.17, 369/44.19, 44.21, 44.22, 54, 58, 112

[56] References Cited

U.S. PATENT DOCUMENTS 5,648,951  7/1997  Kato et al. .

FOREIGN PATENT DOCUMENTS 0 273 071  7/1988  European Pat. Off. .

OTHER PUBLICATIONS

Japanese Abstract, 08–221779, vol. 96, No. 12, 1996.
Japanese Abstract, 08–287501, vol. 97, No. 3, 1996.
Shinoda et al, "Optical Pick–Up for DVD", IEEE Transactions on Consumer Electronics, vol. 42, No. 3, Aug., 1996.

*Primary Examiner*—Paul W. Huber
*Attorney, Agent, or Firm*—Pillsbury Madison & Sutro LLP

[57] ABSTRACT

An optical pickup apparatus for recording/reproducing an information onto/from an optical disc. The optical pickup apparatus comprises a base having a first shaft and a second shaft, an object lens holder rotatably coupled to the first shaft in such a manner that the holder linearly moves along the first shaft, a first object lens for a compact disc and a second object lens for a digital versatile disc which are disposed in the object lens holder, and a pickup section having a first end rotatably coupled to the second shaft and a second end disposed below the object lens holder, the pickup section recording/reproducing the information onto/from the optical disc by using the first and second object lenses. The pickup section is coupled to the second shaft so as to allow the pickup section to be positioned below the first and second object lenses. The object lens holder of the optical pickup apparatus moves minutely when the apparatus records/reproduces an information onto/from an optical disc. Thereby, a performance of the optical pickup apparatus is enhanced.

6 Claims, 5 Drawing Sheets

OPTICAL PICKUP APPARATUS

BACKGROUND OF THE INVENTION

1. Field of the Invention

The present invention relates to an optical pickup apparatus, more particularly to an optical pickup apparatus which can make an object lens holder receiving object lenses therein move minutely when the apparatus records/reproduces an information onto/from an optical disc, thereby enhancing a performance of the apparatus.

2. Description of the Prior Art

In general, an optical pickup apparatus is a device for recording/reproducing an information onto/from an optical disc.

When the optical pickup apparatus records an information onto an optical disc, an optical beam is radiated from a semiconductor laser and is focused on an information recording surface of the optical disc as a shape of beam spots. Then, a temperature of the information recording surface rises up to the Curie point, so the information recording surface loses a coercive force and is magnetized so as to correspond to an external magnetic field applied thereto. Thereafter, the radiation of the optical beam is stopped while the external magnetic field is continuously applied to the optical disc. Subsequently, the temperature of the information recording surface is dropped below the Curie point so that the information recording surface is maintained in a magnetized state, thereby recording the information thereon.

When the optical pickup apparatus reproduces an information from the optical disc, the semiconductor laser radiates an optical beam at a temperature below the Curie point onto the information recording surface of the optical disc so as to focus the optical beam on the information recording surface. Then, a Kerr effect or magneto-optical effect appear in the optical beam so as to affect the information recording surface, thereby rotating a polarizing plane of the optical beam at an angle depending upon the magnetized state of the information recording surface. Therefore, the optical pickup apparatus reproduces the information on the optical disc by detecting the magnetized state of the information recording surface based on the rotating angle of the polarizing plane.

An optical disc has an information track formed thereon in a concentrical or spiral manner with an interval of about 1.6 micrometer. The optical pickup apparatus records/reproduces data onto/from a predetermined position of an optical disc by means of the information track. The optical pickup apparatus performs a focusing servo and a tracking servo in order to precisely record/reproduce data onto/from the optical disc. That is, the optical pickup apparatus controls the optical beam so that it is focused on the information track and it precisely follows it. Thereafter, the optical pickup apparatus detects servo error signals including focusing error signals and tracking error signals, and a holder receiving object lens therein moves along tracking and focusing directions based on the detected servo error signals.

A conventional optical pickup apparatus comprises an object lens holder which receives object lenses therein and moves along tracking and focusing directions with respect to a shaft. The conventional optical pickup apparatus will be explained with reference to FIG. 4 which is a perspective view of the conventional optical pickup apparatus 100.

An object lens holder 130 is rotatably coupled to a shaft 120 integrally extending from a base 110 in such a manner that the object lens holder 130 can vertically move along shaft 120. A first object lens 121 for a compact disc (hereinafter referred as a CD) and a second object lens 122 for digital versatile disc(hereinafter referred as a DVD) are received in the object lens holder 130 so as to be moved together with the object lens holder 130. The first and second object lenses 121 and 122 are spaced apart from shaft 120 by a same distance, that is l1=l2. A tracking coil 141 is fixedly attached to a predetermined position on a side wall of the object lens holder 130, and a tracking magnet 142 is fixedly attached to an upper surface of the base 110 such that the tracking magnet 142 is positioned adjacent to the tracking coil 141. When an electric current flows through the tracking coil 141, a magnetic field is generated therearound and interacts with the tracking magnet 142 so that the object lens holder 130 is urged to rotate with respect to the shaft 120. A focusing coil 151 is fixedly attached to an underside of the object lens holder 130, and a focusing magnet 152 is fixedly attached to a predetermined position in the base 110. When a current flows through the focusing coil 151, a magnetic field is generated there-around and interacts with the focusing magnet 152 so that the object lens holder 130 is urged to vertically move along the shaft 120.

A holographic element(not shown) is provided between the base 110 and the object lens holder 130. The holographic element radiates a laser beam toward the first and second lenses 121 and 122 which are disposed in object lens holder 130 and receives a reflected laser beam so as to record/reproduce an information onto/from an optical disc(not shown). When the object lens holder 130 rotates such that the first object lens 121 is positioned in a path through which a laser beam radiated by the holographic element passes, the holographic element records/reproduces an information onto/from the CD via the first object lens 121. On the other hand, when the object lens holder 130 rotates such that the second object lens 122 is positioned in the path through which a laser beam radiated by the holographic element passes, the holographic element records/reproduces an information onto/from a DVD via the second object lens 122.

A main PCB(printed circuit board) 161 is mounted on an upper surface of the object lens holder 130 and distributes an electric current which is applied therein from a micom(not shown) into the tracking coil 141 and the focusing coil 151, respectively. The main PCB 161 is electrically connected to a flexible PCB 162 which is electrically connected to the micom. The flexible PCB 162 is produced by depositing a thin copper plate on a film, and is easily bent but is strongly resistant to a torsion. Non-described numeral 115 is a support plate.

Therefore, in the conventional optical pickup apparatus, the flexible PCB interferes with the rotation of the object lens holder, so the object lens holder 130 cannot easily rotate. That is, when the object lens holder 130 rotates to alternatively place the first and second object lenses 121 and 122 in the path through which a laser beam passes, the flexible PCB 162 strongly interferes with the object lens holder 130, thereby disturbing a rotation of the optical pickup apparatus.

Meanwhile, U.S. Pat. No. 5,648,951 issued to Makoto discloses an optical pickup apparatus which can precisely record/reproduce an information onto/from a disc. But the optical pickup apparatus also cannot solve the above mentioned problem.

SUMMARY OF THE INVENTION

The present invention has been made to overcome the above described problems of the prior arts, and accordingly it is an object of the present invention to provide an optical pickup apparatus which can make an object lens holder receiving object lenses therein move minutely when the apparatus records/reproduces an information onto/from an optical disc, thereby enhancing a performance of the apparatus.

To achieve the above object, the present invention provides an optical pickup apparatus for recording/reproducing an information onto/from an optical disc, the optical pickup apparatus comprising: a base having a first shaft and a second shaft; an object lens holder rotatably coupled to the first shaft in such a manner that the holder linearly moves along the first shaft; a first object lens for a compact disc and a second object lens for a digital versatile disc which are disposed in the object lens holder; a pickup section having a first end rotatably coupled to the second shaft and a second end disposed below the object lens holder, the pickup section recording/reproducing the information onto/from the optical disc by using the first and second object lenses; and a means for rotating the pickup section so as to allow the pickup section to be positioned below the first and second object lenses.

According to the preferred embodiment of the present invention, the pickup section includes a case rotatably coupled to the second shaft. And the pickup section includes a holograpic element which is disposed in the case, for radiating a first laser into the first and second object lenses and for receiving a second laser reflected from the optical disc. Also, the pickup section includes a reflection mirror for directing the first laser into the first and second object lenses, and for directing the second laser to the holograpic element. The reflection mirror is disposed in the case and is positioned below the first and second object lenses when the case rotates.

The rotating means includes a pair of cores installed at both sides of the pickup section, coils wound around the pair of cores and a pair of magnets installed in opposite to the cores on the base. The pair of magnets have different poles when the cores are magnetized by an electric current applied to the coils.

And a first distance between the first object lens and the second shaft is identical to a second distance between the second object lens and the second shaft.

According to the optical pickup apparatus, the object lens holder receiving object lenses therein moves minutely when the apparatus records/reproduces an information onto/from an optical disc. Thereby, a performance of the optical pickup apparatus is enhanced.

BRIEF DESCRIPTION OF THE DRAWINGS

The above object, and other features and advantages of the present invention will become more apparent by describing in detail preferred embodiments thereof with reference to the attached drawings, in which.

DESCRIPTION OF THE PREFERRED EMBODIMENT

Hereinafter, a preferred embodiment of the present invention will be described in detail with reference to the accompanying drawings.

Figure 1:
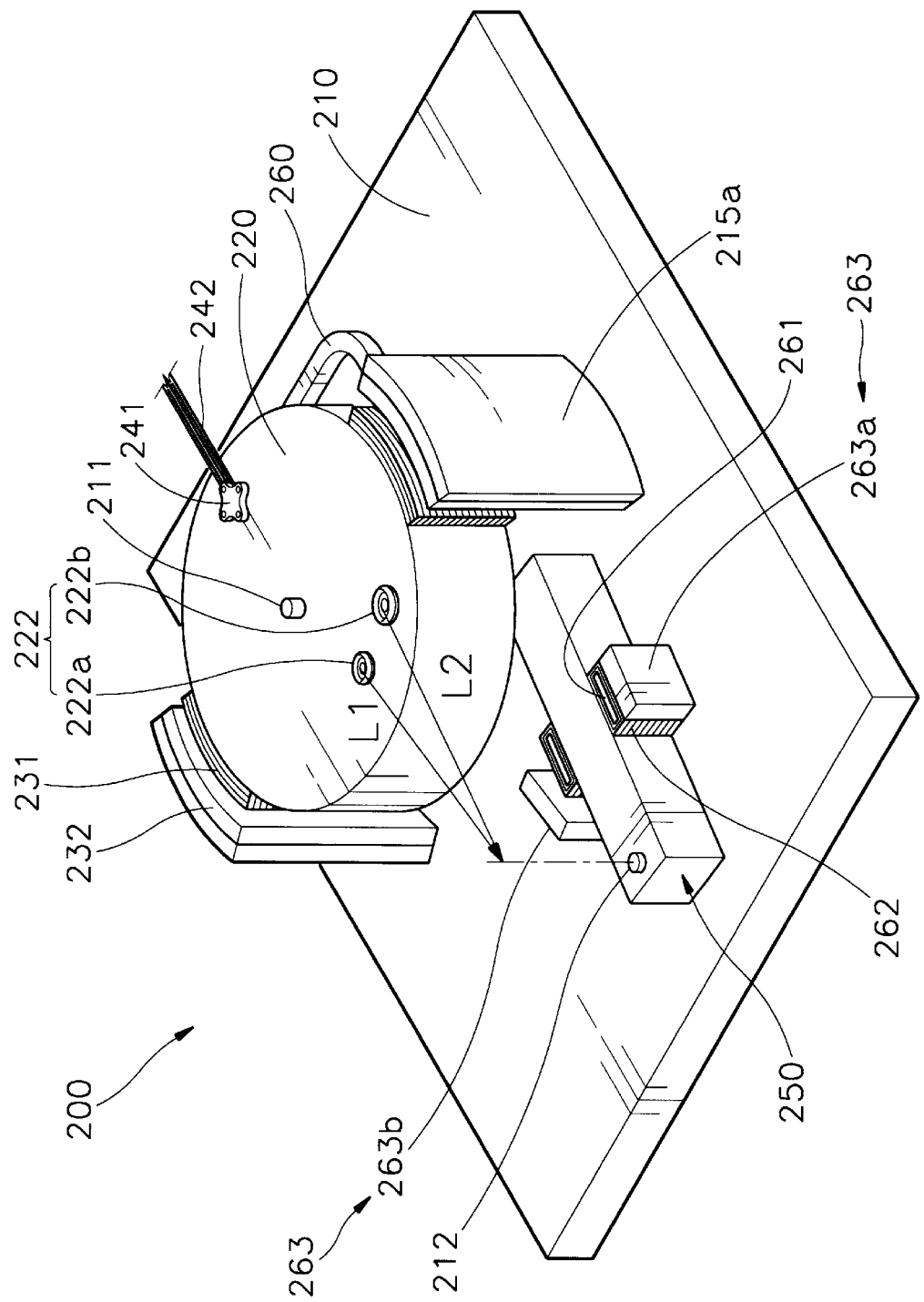
FIG. 1 is a perspective view of the optical pickup apparatus according to one embodiment of the present invention.
Figure 2:
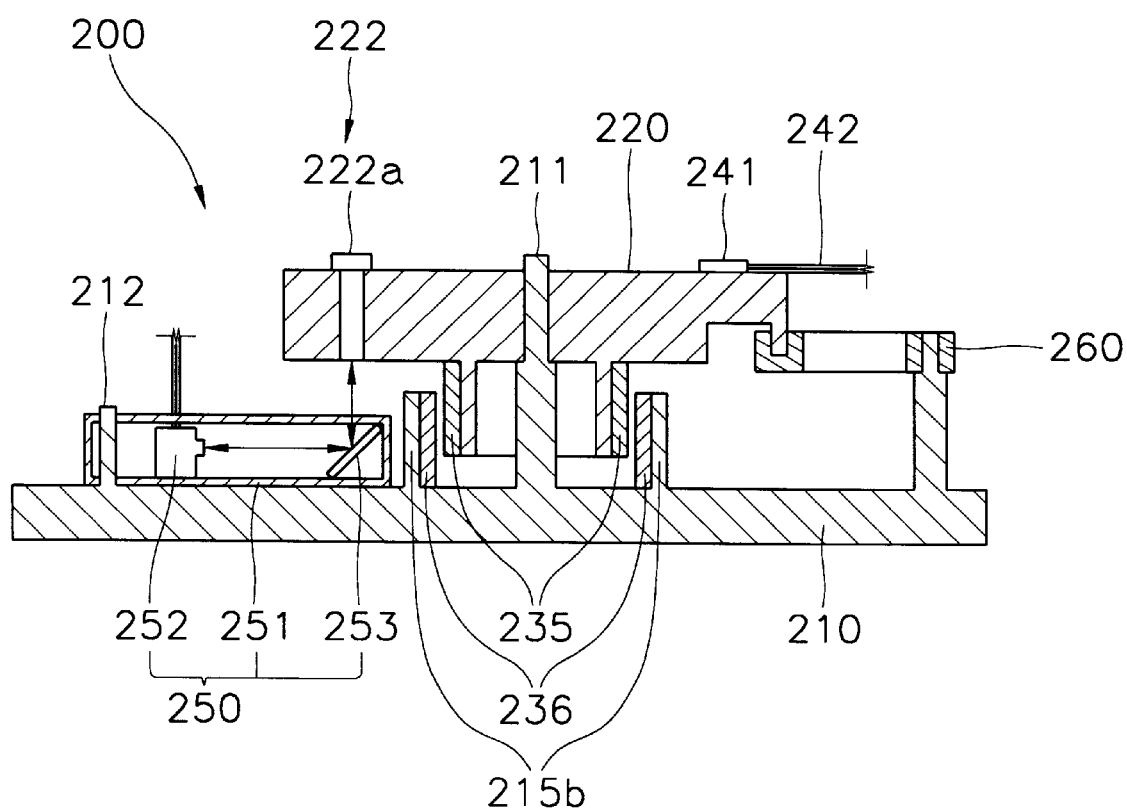
FIG. 2 is a side cross-sectional view showing the inner structure of the optical pickup apparatus illustrated in FIG. 1.

FIG. 1 is a perspective view of the optical pickup apparatus according to one embodiment of the present invention, and FIG. 2 is a side cross-sectional view showing the inner structure of the optical pickup apparatus illustrated in FIG. 1.

As shown FIG. 1 and FIG. 2, the optical pickup apparatus 200 according to the embodiment includes a base 110 having a first shaft 211 and a second shaft 212 which are integrally extended from the base 110. An object lens holder 220 is rotatably coupled to the first shaft 211 in such a manner that the object lens holder 220 linearly moves along the first shaft 211. Objects lenses 222 for focusing an information surface of a tape of an optical disc(not shown) are disposed in the object lens holder 220 so as to be moved together with the object lens holder 210. The object lenses 222 have a first object lens 222a for compact disc(CD) and a second object lens 222 for a digital versatile disc(DVD).

A tracking coil 231 is fixedly attached to a side wall of the object lens holder 220, and a tracking magnet 231 is installed in an upper surface of the base 210 such that the tracking magnet 232 is positioned opposite to the tracking coil 231. A focusing coil 235 is fixedly attached to a central part of the lower surface of the object lens holder 220, and a focusing magnet 236 is installed in an upper surface of the base 210 such that the focusing magnet 236 is positioned opposite to the focusing coil 235.

A main PCB (printed circuit board) 241 is mounted on an upper surface of the object lens holder 220 and distributes an electric current applied therein from a micom (not shown) into the tracking coil 231 and the focusing coil 235, respectively. The main PCB 241 is electrically connected to a flexible PCB 242 which is electrically connected to the micom. Therefore, when the main PCB 241 distributes an electric current into the tracking coil 231 and the focusing coil 235, a magnetic field is generated there-around. The magnetic field interacts with the tracking magnet 232 so that the object lens holder 22 is urged to rotate with respect to the first shaft 21 1, and interacts with focusing magnet 236 so that the object lens holder 120 is urged to vertically move along the shaft 212.

The object lens holder 220 of the optical pickup apparatus 200 according to the embodiment moves minutely. In more detail, the object lens 220 rotates minutely to the tracking direction, so the flexible PCB does not interfere with the rotation of the object lens holder 220.

To solve the above-mentioned problem, the optical pickup apparatus 200 is provided in a pickup section 250 for recording/reproducing an information onto/from the optical disc. The pickup section 250 is rotatably coupled to the second shaft 212 of the base 210 so as to follow the first and second object lenses 222a and 222b.

In more detail, there is a space between the upper surface of the base 210 and the object lens holder 220. And, the pickup section 250 includes a case 251, and a first end of the case 251 is rotatably coupled to the second shaft 212 and a second end of the case 251 is disposed below the object lens holder 220. At this time, a first distance L1 between the first object lens 222a and the second shaft 212 is identical to a second distance L2 between the second object lens 222b and the second shaft 212. A holograpic element 252 for radiating a first laser into the first and second object lenses 222a and 222b and for receiving a second laser reflected from the optical disc(not shown) is disposed in the case 251. A reflection mirror 253 for directing the first laser into the first and second object lenses 222a and 222b and for directing the second laser to the holograpic element 252, is also disposed in the case 251. The reflection mirror 253 is directly positioned below the first and second object lens 222a and 222b when the case 251 rotates.

The case 210 of the optical pickup apparatus 200 according to the embodiment can rotate such that the case 210 allows the reflection mirror 253 to be positioned below the first and second object lenses 222a and 222a. This will be explained.

A pair of the cores 261 are installed at both sides wall of the case 251, and a coil 262 is wound around the the pair cores 261. A pair of magnets 263 having different poles are installed on the base, and the pair of magnets 263 are installed opposite to the cores 261. When an electric current is applied to the coil 262, the cores 261 are magnetized. Therefore, one of the pair magnets 263 attracts the cores 261, and the case rotates. In more detail, when an electric current flows through the coil 262, a magnetic field is generated around the cores 261. One magnet 263a having a magnetism which is opposite to the magnetism of the cores 261 attracts the cores 261. When a flow of the electric current turns, the other magnet 263b attracts the cores 261. In this manner, the case 251 can rotate. Non-described numerals 215a and 215b are a support plate, non-described numeral 260 is damper for absorbing a vibration which is transmitted from an outside of the object lens holder 220 to the object lens holder 220.

Figure 3A:
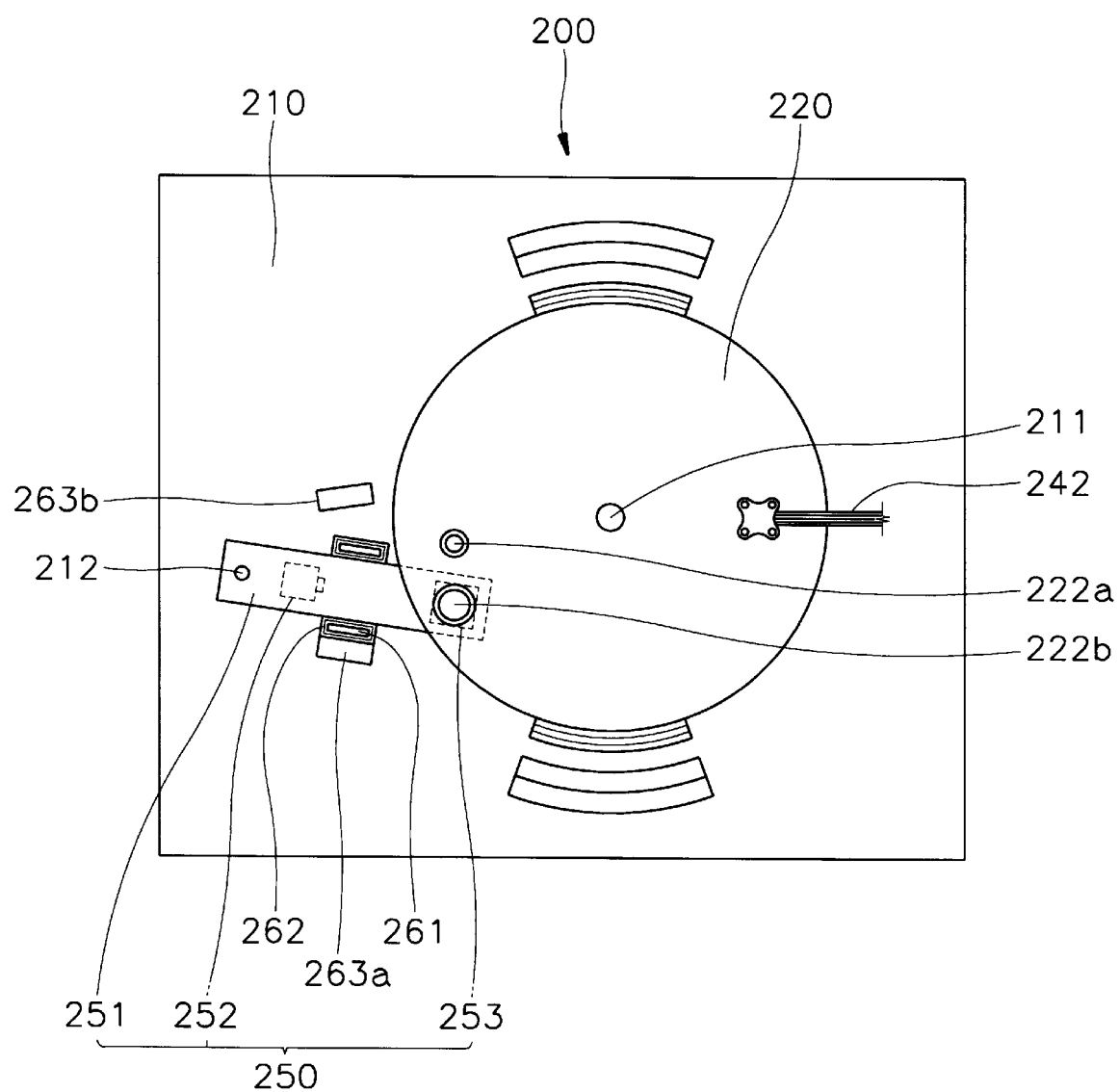
FIG. 3A and 3B are a plan view explaining the operation of the optical pickup apparatus illustrated in FIG. 1.
Figure 3B:
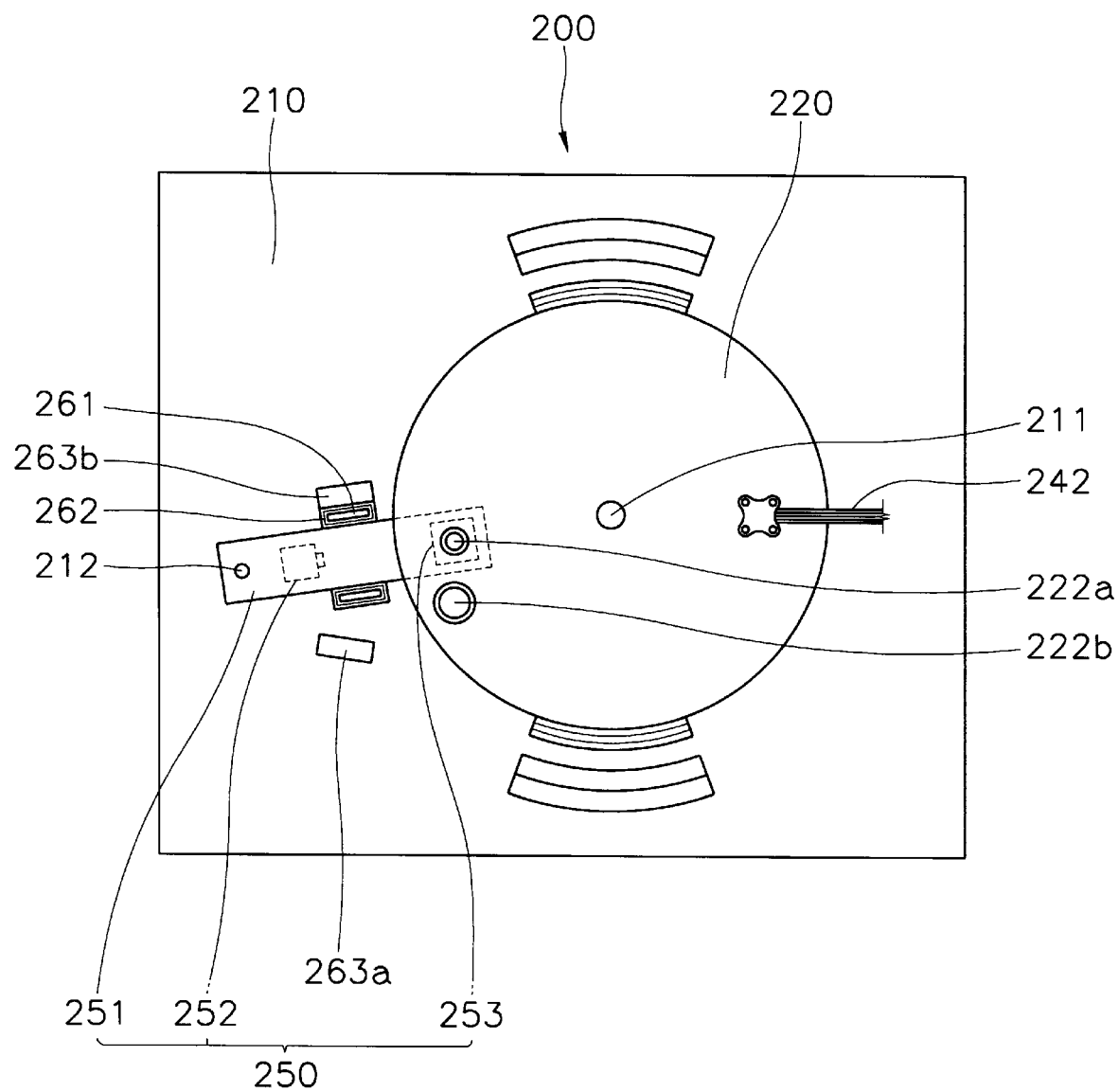
Figure 4:
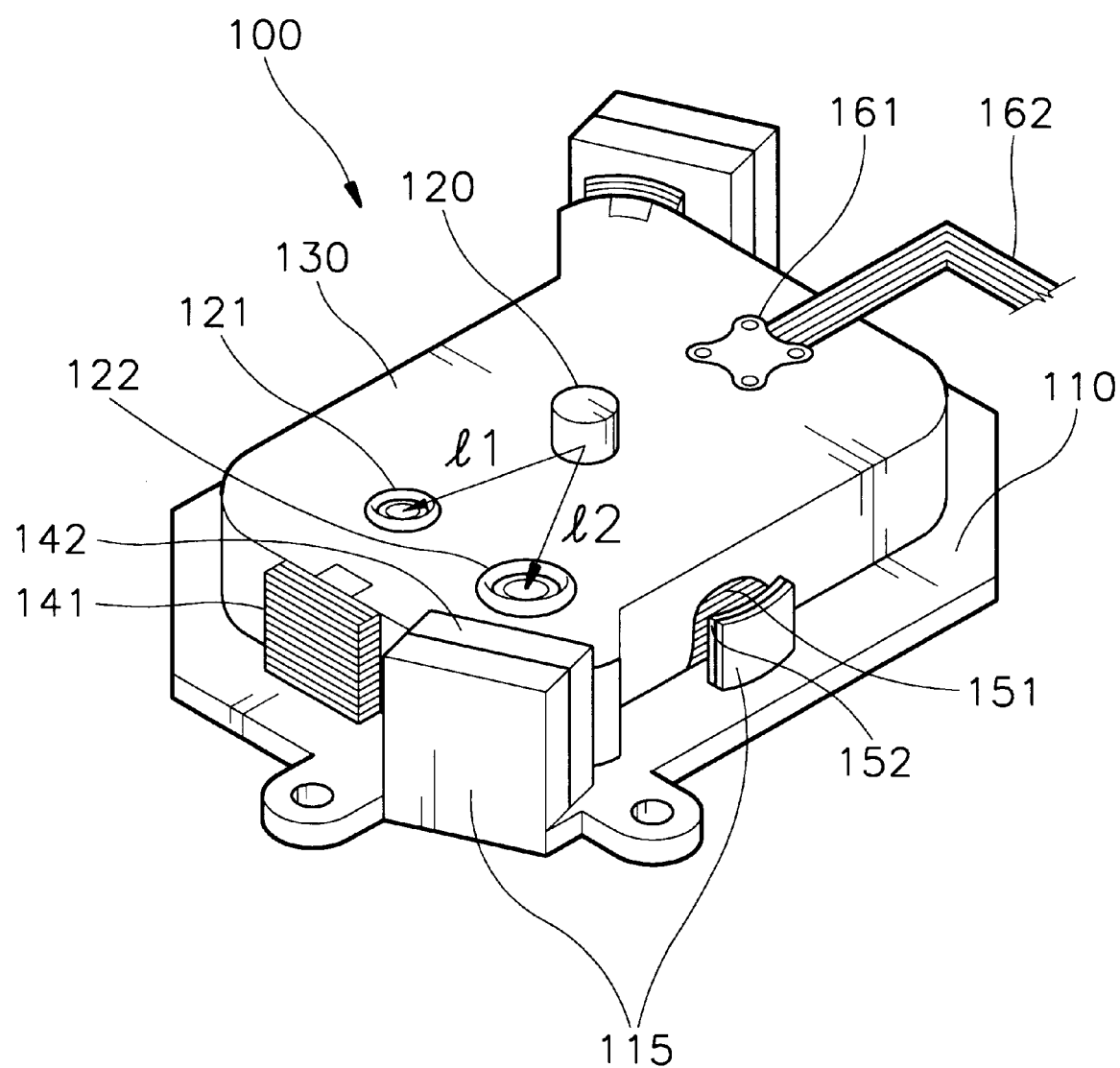
FIG. 4 is a perspective view of the a conventional optical pickup apparatus.

Hereinafter, the operation of the optical pickup apparatus having the above construction is explained with reference to FIG. 3. FIGS. 3A and 3B are a plan view explaining the operation of the optical pickup apparatus illustrated in FIG. 1.

It is assumed that the reflection mirror 253 of the pickup 250 is positioned directly below the first object lens 222a like as in FIG. 3A. And, when a flow of the electric current turns, the reflection mirror 253 is positioned directly below the second object lens 222b by means of a magnetic force like as in FIG 5B. After that, micom(not shown) applies an electric current to the tracking and focusing coils 231 and 235. So, the object lens holder 220 minutely rotates around the first shaft 211, and vertically moves up/down. That is, a rotating angle of the object lens holder 220 is minute, and the flexible PCB 242 can not interfere with the rotation of the object lens holder 130, As described above, the optical pickup apparatus according to the embodiment of the present invention has the advantage that the flexible PCB can not interfere the the rotation of the object lens when the optical pickup apparatus records/reproduces an information onto/from an optical disc. Thereby, a rotating sensitivity of the object 1nes holder and a performance of the optical pickup apparatus are enhanced.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. An optical pickup apparatus for recording/reproducing an information onto/from an optical disc, the optical pickup apparatus comprising:
   a base having a first shaft and a second shaft;
   an object lens holder rotatably coupled to the first shaft in such a manner that the holder linearly moves along the first shaft;
   a first object lens for a compact disc and a second object lens for a digital versatile disc which are disposed in the object lens holder;
   a pickup section having a first end rotatably coupled to the second shaft and a second end disposed below the object lens holder, the pickup section recording/reproducing the information onto/from the optical disc by using the first and second object lenses; and
   a means for rotating the pickup section so as to allow the pickup section to be positioned below the first and second object lenses.

2. The pickup apparatus as claimed in claim 1, wherein the pickup section includes a case rotatably coupled to the second shaft, a holograpic element which is disposed in the case for radiating a first laser into the first and second object lenses and for receiving a second laser reflected from the optical disc, and a reflection mirror for directing the first laser into the first and second object lenses and for directing the second laser to the holograpic element, the reflection mirror being disposed in the case, the reflection mirror being positioned below the first and second object lenses when the case rotates.

3. The pickup apparatus as claimed in claim 1, wherein the means for rotating the pickup section includes a pair of cores installed at both sides of the pickup section, coils wound around the pair of cores, and a pair of magnets installed opposite to the cores on the base, the pair of magnets having different poles from each other when the cores are magnetized by an electric current applied to the coils.

4. The pickup apparatus as claimed in claim 1, wherein a first distance between the first object lens and the second shaft is identical to a second distance between the second object lens and the second shaft.

5. An optical pickup apparatus for recording/reproducing an information onto/from an optical disc, the optical pickup apparatus comprising:
   a base having a first shaft and a second shaft;
   an object lens holder rotatably coupled to the first shaft in such a manner that the holder linearly moves along the first shaft;
   a first object lens for a compact disc and a second object lens for a digital versatile disc which are fixed to the object lens holder, a first distance between the first object lens and the second shaft being identical to a second distance between the second object lens and the second shaft;
   a pickup section having a first end rotatably coupled to the second shaft and a second end disposed below the object lens holder, the pickup section recording/reproducing the information onto/from the optical disc by using the first and second object lenses, the pickup section including a case rotatably coupled to the second shaft, a holograpic element which is disposed in the case, for radiating a first laser into the first and second object lenses and for receiving a second laser reflected from the optical disc, and a reflection mirror for directing the first laser into the first and second object lenses and for directing the second laser to the holograpic element, the reflection mirror being disposed in the case, the reflection mirror being positioned below the first and second object lenses when the case rotates; and
   a means for rotating the pickup section so as to allow the pickup section to be positioned below the first and second object lenses.

6. The pickup apparatus as claimed in claim 5, wherein the means for rotating the pickup section includes a pair of cores installed at both sides of the pickup section, coils wound around the pair of cores, and a pair of magnets installed opposite to the cores on the base, the pair of magnets having different poles from each other when the cores are magnetized by an electric current applied to the coils.

* * * * *